United States Patent
Homan et al.

(10) Patent No.: US 11,765,201 B2
(45) Date of Patent: Sep. 19, 2023

(54) GENERATING IMAGE DATA REPRESENTATIVE OF INDUSTRIAL AUTOMATION SYSTEM CONFIGURATIONS

(71) Applicant: Rockwell Automation Asia Pacific Business Center Pte. Ltd., Singapore (SG)

(72) Inventors: Sean Homan, Singapore (SG); Andrian Santoso, Singapore (SG); Pavan Kumar Pasunuri, Singapore (SG)

(73) Assignee: ROCKWELL AUTOMATION ASIA PACIFIC BUSINESS CENTER PTE. LTD., Singapore (SG)

( * ) Notice: Subject to any disclaimer, the term of this patent is extended or adjusted under 35 U.S.C. 154(b) by 149 days.

(21) Appl. No.: 17/148,323

(22) Filed: Jan. 13, 2021

(65) Prior Publication Data

US 2022/0224698 A1 Jul. 14, 2022

(51) Int. Cl.
*G06F 3/14* (2006.01)
*H04N 1/32* (2006.01)
*H04L 9/40* (2022.01)
*G05B 19/4155* (2006.01)
(Continued)

(52) U.S. Cl.
CPC ........ *H04L 63/145* (2013.01); *G05B 19/4155* (2013.01); *G05B 23/0216* (2013.01);
(Continued)

(58) Field of Classification Search
CPC ..... H04L 63/145; H04L 9/32; H04L 63/0272; H04L 63/029; G05B 19/4155; G05B 23/0216; G05B 2219/23291; G05B 2219/24167; G05B 2219/31368; G05B 2219/36133; G05B 2219/36542; G06F 3/14; H04N 1/32149
See application file for complete search history.

(56) References Cited

U.S. PATENT DOCUMENTS 5,961,597 A * 10/1999 Sapir .................... H04L 12/4608
709/224
9,547,973 B1 * 1/2017 Hutz ..................... G08B 25/016
(Continued)

FOREIGN PATENT DOCUMENTS

WO WO-2021155348 A1 * 8/2021

OTHER PUBLICATIONS

Partial European Search Report for Application No. 22151133.0, dated May 31, 2022, 18 pages.
(Continued)

*Primary Examiner* — Kenneth M Lo
*Assistant Examiner* — Jonathan Michael Skrzycki
(74) *Attorney, Agent, or Firm* — Fletcher Yoder, P.C.

(57) ABSTRACT

A method, performed by at least one processor, comprising generating a first set of images representative of configuration data associated with an industrial automation system. An electronic display may display at least one image of the first set of images. The processor may detect a change in the configuration data and retrieve updated configuration data from the industrial automation system. The processor may encode the updated configuration data into a second set of images and display at least one additional image of the second set of images on the electronic display.

20 Claims, 4 Drawing Sheets

(51) Int. Cl.
  *G05B 23/02* (2006.01)
  *H04L 9/32* (2006.01)
(52) U.S. Cl.
  CPC .............. *H04L 9/32* (2013.01); *H04L 63/029* (2013.01); *H04L 63/0272* (2013.01); *G05B 2219/23291* (2013.01); *G05B 2219/24167* (2013.01); *G05B 2219/31368* (2013.01); *G05B 2219/36133* (2013.01); *G05B 2219/36542* (2013.01); *G06F 3/14* (2013.01); *H04N 1/32149* (2013.01)

(56) References Cited

U.S. PATENT DOCUMENTS

| | | | |
|---|---|---|---|
| 9,917,737 B2 | 3/2018 | Neilson et al. | |
| 2011/0079639 A1* | 4/2011 | Khan | H04N 1/00326 710/33 |
| 2012/0158922 A1* | 6/2012 | Aggarwal | H04W 4/50 709/220 |
| 2013/0075463 A1* | 3/2013 | Campbell | G05B 23/0216 235/375 |
| 2013/0268128 A1 | 10/2013 | Casilli et al. | |
| 2013/0299571 A1* | 11/2013 | Metso | G06K 7/1095 235/494 |
| 2014/0164580 A1 | 6/2014 | Cheloff | |
| 2014/0336791 A1* | 11/2014 | Asenjo | G05B 13/026 700/44 |
| 2016/0086045 A1 | 3/2016 | Roberts et al. | |
| 2016/0191318 A1* | 6/2016 | Neilson | H04L 41/0883 709/220 |

OTHER PUBLICATIONS

Extended European Search Report for Application No. 22151133.0 dated Aug. 31, 2022, 15 pages.

* cited by examiner

GENERATING IMAGE DATA REPRESENTATIVE OF INDUSTRIAL AUTOMATION SYSTEM CONFIGURATIONS

BACKGROUND

The present disclosure generally relates to generating image data related to an industrial automation system configuration and, more particularly, to monitoring these industrial configurations using image data to convey information related to the configuration of industrial equipment.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, these statements are to be read in this light, and not as admissions of prior art.

An industrial automation system may include a number of individual systems connected to an automation controller, which facilitates the automation of a number of different manufacturing processes. Each individual system may have distinct firmware relating to an individual manufacturing process and associated manufacturing processes. However, an operator of the respective system may not have full knowledge of each individual system and how each system connects to form the complete industrial automation system. Additionally, the operator may find it challenging to connect an industrial automation system to access or use various system configuration discovery tools and/or resources. As such, improved systems and methods of presenting a configuration of the industrial automation system to operators in an easily discernable manner through the generation of image data are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include an electronic display and a control system with a processor. The processor may receive a request to generate image data representative of configuration data associated with an industrial automation system. The processor may then retrieve the configuration data from storage components of industrial automation devices that are part of the industrial automation system. The processor may then encode the configuration data into the image data and display the image data on the electronic display.

In another embodiment, a method may include generating, via a processor, the image data representative of the configuration data associated with the industrial automation system and displaying the image data via the electronic display. The method may then include detecting a change in the configuration data, retrieving updated configuration data from the storage components associated with the industrial automation devices, and encoding the updated configuration data into a new set of image data. The method may then include displaying the new set of image data via the electronic display.

In a further embodiment, a non-transitory computer-readable medium may include instructions that cause a processor to receive image data representative of the configuration data associated with the industrial automation system and geotag data associated with the image data from a computing device. The processor may then decode the image data to generate the configuration data associated with the industrial automation system and storing the configuration data and the geotag data within a database. The processor may then determine recommendations of updates and replacement products based on the configuration data, the geotag data, and additional configuration data related to the configuration data stored in the database. The processor may then transmit the recommendations and replacement products to the computing device.

DRAWINGS

These and other features, aspects, and advantages of the present disclosure will become better understood when the following detail description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiment of the present disclosure, the articles "a," "an," "the," and "said" are intended to mean that there are one or more of these elements. The terms "comprising," "including," and "having" are intended to be inclusive and mean that there may be additional elements other than the listed elements.

As discussed above, an industrial automation system may include industrial automation equipment that may be connected to control system or device to automate manufacturing processes. Industrial automation systems may be used in various contexts, such as a manufacturing plant, a resource extraction system, a hydrocarbon extraction site, a chemical refinery facility, an industrial plant, a power generation system, a mining system, a brewery, a food processing plant, or the like. These industrial automation systems encompass a wide variety of different individual systems that each contribute to the manufacturing process as a whole. As a result of this arrangement, operators may find issues with not knowing which individual systems are part of the industrial automation system, if the individual systems are updated, or where the individual systems are placed within the industrial automation system.

To remedy this, a control/monitoring system may collect data regarding a configuration (e.g., components, arrangements, network data) and generate image data representative of the configuration. As used herein, "image data" is intended to describe a medium of encoded data for transmission, such as a QR Code®. To accomplish this, the control system may collect relevant information from the industrial automation system pertaining to the operation, maintenance, and history of each individual system or component of the industrial automation system. Additionally, the control system may reference an input/output (I/O) tree, which may represent connections between each individual system of the industrial automation system. In some embodiments, the configuration information related to the industrial automation system may be stored in a storage component locally accessible to the control system.

After the control system has collected or retrieved the information (e.g., networking, firmware version) relating to the components of the industrial automation system, the control system may generate image data (e.g., a QR Code®) that includes or encodes data related to the configuration of the industrial automation system. The control system may then display the image data via an electronic display, a Human Machine Interface (HMI), Graphical User Interface (GUI), or the like. A computing device (e.g., smart phone, tablet computer) may scan the image data and convert the image data into a component list that details the configuration of the respective industrial automation system. In some embodiments, the computing device may display the image data to be scanned by an accompanying computing device. The image data may be transmitted to a secure receiving component that is dedicated to limited communications with the control system or the computing device that acquired or scanned the image data. As such, the receiving component may limit opportunities for other devices to access data stored in the control system or the computing device via other networks. In addition to transmitting the image data, the computing device may transmit location (e.g., geotag) information associated with the industrial automation system. After receiving the image data and the location information, the receiving component may process the image data and update a cloud-based computing system to store information related to the configuration of the respective industrial automation system.

In some embodiments, the cloud-based computing system may receive multiple sets of image data representative of the industrial automation system at different times. The cloud-based computing system may decode the image data to determine the configuration data of the industrial automation system and update the configuration data stored in a memory or storage (e.g., database) accessible to the cloud-based computing system based on any new changes. The cloud-based computing system may then store the configuration data and corresponding location data in the database. After storing the data in the database, the cloud-based computing system may then analyze the configuration data, compare the new entry to a historical database of configuration information for similar equipment, and identify recommendations and/or upgrades for the equipment. These recommendations may consist of identifying firmware updates for individual systems that make up part of the industrial automation system and new products or components that may be available for purchase to complement or improve the existing configuration. Additionally, the cloud-based computing system may transmit these recommendations to a computing device, such that the operator may become aware of the recommendations. Additional details with regard to acquiring, sending, and analyzing configuration data for the industrial automation system will be discussed below with reference to FIGS. 1-5.

Figure 1:
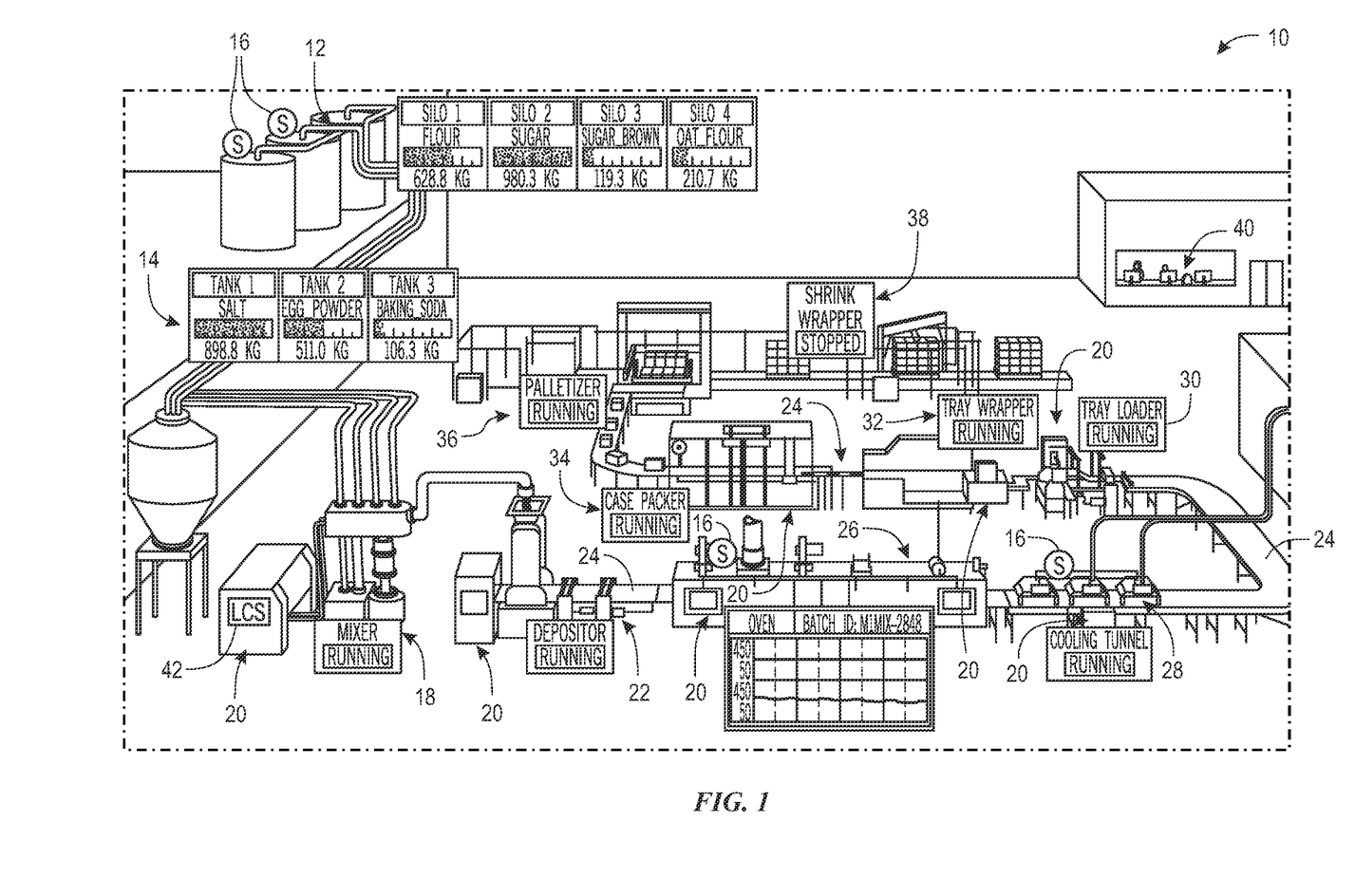
FIG. 1 illustrates an example industrial automation system employed by a food manufacturer, in accordance with an embodiment.

By way of introduction, FIG. 1 illustrates an example industrial automation system 10 employed by a food manufacturer. It should be noted that although the example industrial automation system 10 of FIG. 1 is directed at a food manufacturer, the present embodiments described herein may be employed within any suitable industry, such as automotive, mining, hydrocarbon production, manufacturing, and the like. The following brief description of the example industrial automation system 10 employed by the food manufacturer is provided herein to help facilitate a more comprehensive understanding of how the embodiments described herein may be applied to industrial devices to significantly improve the operations of the respective industrial automation system based on the current configuration of the equipment in the industrial automation system. As such, the embodiments described herein should not be limited to be applied to the example depicted in FIG. 1.

Referring now to FIG. 1, the example industrial automation system 10 for a food manufacturer may include silos 12 and tanks 14. The silos 12 and the tanks 14 may store different types of raw material, such as grains, salt, yeast, sweeteners, flavoring agents, coloring agents, vitamins, minerals and preservatives. In some embodiments, sensors 16 may be positioned within or around the silos 12, the tanks 14, or other suitable locations within the industrial automation system 10 to measure certain properties, such as temperature, mass, volume, pressure, humidity, and the like.

The raw materials be provided to a mixer 18, which may mix the raw materials together according to a specified ratio. The mixer 18 and other machines in the industrial automation system 10 may employ certain industrial automation devices 20 to control the operations of the mixer 18 and other machines. The industrial automation devices 20 may include controllers, input/output (I/O) modules, motor control centers, motors, human machine interfaces (HMIs), operator interfaces, contactors, starters, sensors 16, actuators, conveyors, drives, relays, protection devices, switchgear, compressors, sensor, actuator, firewall, network switches (e.g., Ethernet switches, modular-managed, fixed-managed, service-router, industrial, unmanaged, etc.) and the like.

The mixer 18 may provide a mixed compound to a depositor 22, which may deposit a certain amount of the mixed compound onto conveyor 24. The depositor 22 may deposit the mixed compound on the conveyor 24 according to a shape and amount that may be specified to a control system for the depositor 22. The conveyor 24 may be any suitable conveyor system that transports items to various types of machinery across the industrial automation system 10. For example, the conveyor 24 may transport deposited material from the depositor 22 to an oven 26, which may bake the deposited material. The baked material may be transported to a cooling tunnel 28 to cool the baked material, such that the cooled material may be transported to a tray loader 30 via the conveyor 24. The tray loader 30 may include machinery that receives a certain amount of the cooled material for packaging. By way of example, the tray loader 30 may receive 25 ounces of the cooled material, which may correspond to an amount of cereal provided in a cereal box.

A tray wrapper 32 may receive a collected amount of cooled material from the tray loader 30 into a bag, which may be sealed. The tray wrapper 32 may receive the collected amount of cooled material in a bag and seal the bag using appropriate machinery. The conveyor 24 may transport the bagged material to case packer 34, which may package the bagged material into a box. The boxes may be transported to a palletizer 36, which may stack a certain number of boxes on a pallet that may be lifted using a forklift or the like. The stacked boxes may then be transported to a shrink wrapper 38, which may wrap the stacked boxes with shrink-wrap to keep the stacked boxes together while on the pallet. The shrink-wrapped boxes may then be transported to storage or the like via a forklift or other suitable transport vehicle.

To perform the operations of each of the devices in the example industrial automation system 10, the industrial automation devices 20 may be used to provide power to the machinery used to perform certain tasks, provide protection to the machinery from electrical surges, prevent injuries from occurring with human operators in the industrial automation system 10, monitor the operations of the respective device, communicate data regarding the respective device to a supervisory control system 40, and the like. In some embodiments, each industrial automation device 20 or a group of industrial automation devices 20 may be controlled using a local control system 42. The local control system 42 may include receive data regarding the operation of the respective industrial automation device 20, other industrial automation devices 20, user inputs, and other suitable inputs to control the operations of the respective industrial automation device(s) 20.

The local control system 42 may have access to configuration data associated with the connected industrial automation devices 20. That is, the local control system 42 may include memory or a storage component that stores information concerning the configuration of each industrial automation device 20 connected to it. In some embodiments, the information or configuration data may be populated or input by an operator at the time the respective industrial automation device 20 is installed. Additionally, the local control system 42 may query the connected industrial automation device 20 to retrieve configuration data, such as model number, serial number, firmware revision, assembly profile, and the like. In some embodiments, the supervisory control system 40 may collect configuration data from multiple local control systems 40 and store the information in a suitable memory or storage component.

Figure 2:
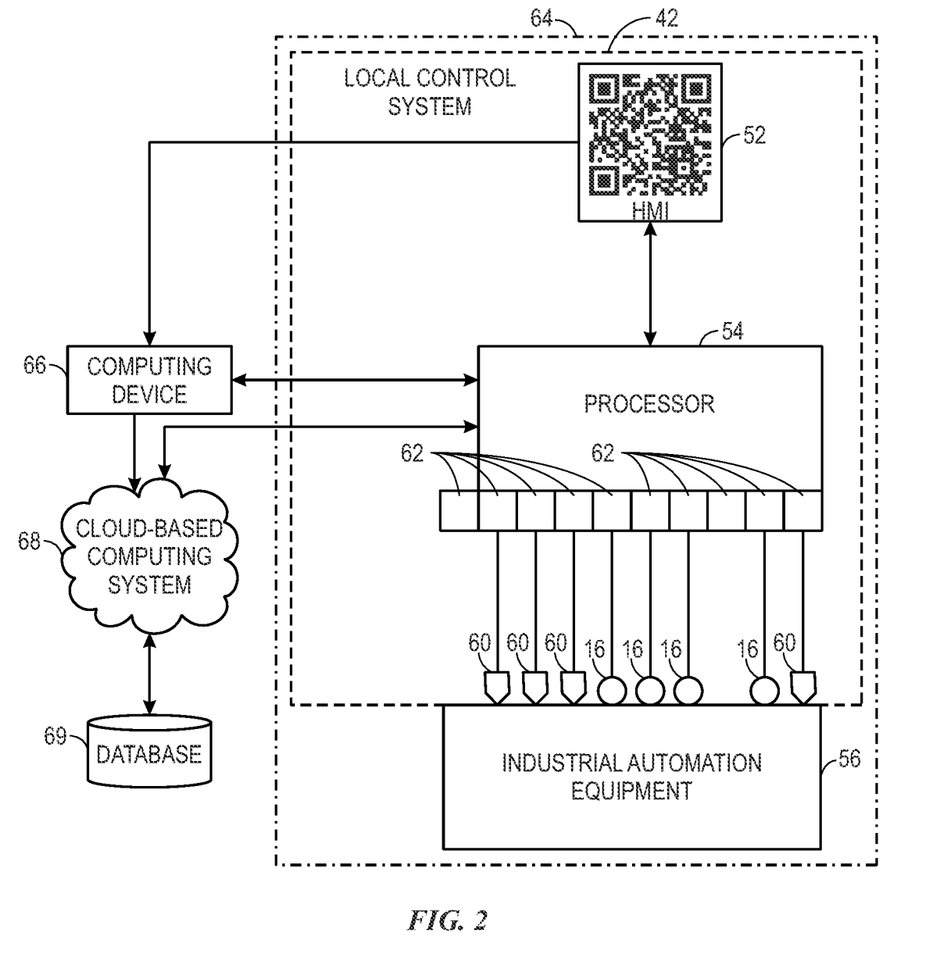
FIG. 2 illustrates a diagrammatical representation of local control system that may produce image data representative of a configuration of connected industrial automation equipment system, in accordance with an embodiment.

By way of example, FIG. 2 illustrates a diagrammatical representation of a local control system 42 that may be employed in any suitable industrial automation system 10, in accordance with embodiments presented herein. In FIG. 2, the local control system 42 is illustrated as including a human machine interface (HMI) 52 and a processor 54 or automation controller adapted to interface with devices that may monitor and control various types of industrial equipment 56. By way of example, the industrial automation equipment 56 may include the mixer 18, the depositor 22, the conveyor 24, the oven 26, and any other suitable piece of machinery described in FIG. 1 or that may be employed in any suitable industrial environment.

It should be noted that HMI 52 and the processor 54, in accordance with embodiments of the present techniques, may generate and encode image data representative of the configuration of industrial automation system to display on the HMI 52. Indeed, various image data mediums may be utilized, such as a QR Code®, for capturing the configuration of the industrial automation equipment system. Such mediums may allow for effective and quick image data encoding and transmission.

As discussed above, the industrial automation equipment 56 may take many forms and include devices for accomplishing many different and varied purposes. For example, the industrial automation equipment 56 may include machinery used to perform various operations in a compressor station, an oil refinery, a batch operation for making food items, a mechanized assembly line, and so forth. Accordingly, the industrial automation equipment 56 may include a variety of operational components, such as electric motors, valves, actuators, temperature elements, pressure sensors, or a myriad of machinery or devices used for manufacturing, processing, material handling, and other applications.

Additionally, the industrial automation equipment 56 may include various types of equipment that may be used to perform the various operations that may be part of an industrial application. For instance, the industrial automation equipment 56 may include electrical equipment, hydraulic equipment, compressed air equipment, steam equipment, mechanical tools, protective equipment, refrigeration equipment, power lines, hydraulic lines, steam lines, and the like. Some example types of equipment may include mixers, machine conveyors, tanks, skids, specialized original equipment manufacturer machines, and the like. In addition to the equipment described above, the industrial automation equipment 56 may be made up of certain automation devices 20, which may include controllers, input/output (I/O) modules, motor control centers, motors, human machine interfaces (HMIs), operator interfaces, contactors, starters, sensors 16, actuators, drives, relays, protection devices, switchgear, compressors, firewall, network switches (e.g., Ethernet switches, modular-managed, fixed-managed, service-router, industrial, unmanaged, etc.) and the like.

In certain embodiments, one or more properties of the industrial automation equipment 56 may be monitored and controlled by certain equipment for regulating control variables used to operate the industrial automation equipment 56. For example, the sensors 16 and actuators 60 may monitor various properties of the industrial automation equipment 56 and may adjust operations of the industrial automation equipment 56, respectively.

In some cases, the industrial automation equipment 56 may be associated with devices used by other equipment. For instance, scanners, gauges, valves, flow meters, and the like may be disposed on industrial automation equipment 56. Here, the industrial automation equipment 56 may receive data from the associated devices and use the data to perform their respective operations more efficiently. For example, the processor 54 of a motor drive may receive data regarding a temperature of a connected motor and may adjust operations of the motor drive based on the data.

In certain embodiments, the industrial automation equipment 56 may include a communication component that enables the industrial equipment 56 to communicate data between each other and other devices. The communication component may include a network interface that may enable the industrial automation equipment 56 to communicate via various protocols such as Ethernet/IP®, ControlNet®, DeviceNet®, or any other industrial communication network protocol. Alternatively, the communication component may enable the industrial automation equipment 56 to communicate via various wired or wireless communication protocols, such as Wi-Fi, mobile telecommunications technology (e.g., 2G, 3G, 4G, LTE), Bluetooth®, near-field communications technology, and the like.

The sensors 16 may be any number of devices adapted to provide information regarding process conditions. The actuators 60 may include any number of devices adapted to perform a mechanical action in response to a signal from an automation controller 54. The sensors 16 and actuators 60 may be utilized to operate the industrial automation equipment 56. Indeed, they may be utilized within process loops that are monitored and controlled by the automation controller 54 and/or the HMI 52. Such a process loop may be activated based on process inputs (e.g., input from a sensor 16) or direct operator input received through the HMI 52. As illustrated, the sensors 16 and actuators 60 are in communication with the processor 54. Further, the sensors 16 and actuators 60 may be assigned a particular address to receive power or coordinate communication to the processor 54.

Input/output (I/O) modules 62 may be added or removed from the local control system 42 via expansion slots, bays, or other suitable mechanisms. In certain embodiments, the I/O modules 62 may be included to add functionality to the processor 54, or to accommodate additional process features. For instance, the I/O modules 62 may communicate with new sensors 16 or actuators 60 added to monitor and control the industrial automation equipment 56. It should be noted that the I/O modules 62 may communicate directly to sensors 16 or actuators 60 through hardwired connections or may communicate through wired or wireless sensor networks, such as Hart or IOLink.

Generally, the I/O modules 62 serve as an electrical interface to the processor 54 and may be located proximate or remote from the processor 54, including remote network interfaces to associated systems. In such embodiments, data may be communicated with remote modules over a common communication link, or network, wherein modules on the network communicate via a standard communications protocol. Many industrial controllers can communicate via network technologies such as Ethernet (e.g., IEEE802.3, TCP/IP, UDP, Ethernet/IP, and so forth), ControlNet, DeviceNet, or other network protocols (Foundation Fieldbus (H1 and Fast Ethernet) Modbus TCP, Profibus) and also communicate to higher level computing systems.

In certain embodiments, the local control system 42 and the industrial automation equipment 56 may make up an industrial automation application 64. The industrial automation application 64 may involve any type of industrial process or system used to manufacture, produce, process, or package various types of items. For example, the industrial applications 64 may include industries such as material handling, packaging industries, manufacturing, processing, batch processing, the example industrial automation system 10 of FIG. 1, and the like.

In certain embodiments, the processor 54 may be communicatively coupled to a computing device 66. In this network, input and output signals generated from the processor 54 may be communicated to the computing device 66. Although the processor 54 may be capable of communicating with the computing device 66, as mentioned above, in certain embodiments, the processor 54 (e.g., local computing system 42) may perform certain operations and analysis without sending data to the computing device 66.

In some embodiments, while communicatively coupled to the processor 54, the computing device 66 may display a webpage representative of the local control system 42. The webpage may include operational data, configuration information, and additional actions to utilize the local control system 42 and the related data. For example, within the webpage, there may be an option to generate and encode image data representative of the configuration of industrial automation system. By utilizing this option, the image data may be displayed on the computing device 66 to be scanned by an accompanying computing device.

In certain embodiments, the computing device 66 and/or the processor 54 may be communicatively coupled to a cloud-based computing system 68. In this network, the computing device 66 may transmit encoded image data generated by processor 54 to the cloud-based computing system 68 for storage and analysis. The cloud-based computing system 68 may then send data relating to the analyzed image data back to the computing device 66. Although the computing device 66 may first transmit image data to the cloud-based computing system 68, in certain embodiments, the cloud-based computing system 68 may transmit data to the computing device 66 without first receiving image data from the computing device 66. That is, in other words, the cloud-based computing system 68 may not need to first receive an input from the computing device 66 to provide an output back to the computing device 66.

In some embodiments, the cloud-based computing system 68 may employ machine learning algorithms to glean insight into trends, patterns, expected issues, and the like based on a correlation between the received configuration data and configuration data regarding various other industrial equipment collected over time. That is, the cloud-based computing system 68 may analyze relationships between the configuration data of similar types of equipment to determine recommendations or operational adjustments (e.g., speed, load, temperature) for equipment to prevent or guard against potential vulnerabilities in an industrial automation system. The operational adjustments or recommendations may include downloading firmware or software updates, recommendations to replace certain components with newer components, and the like.

Figure 3:
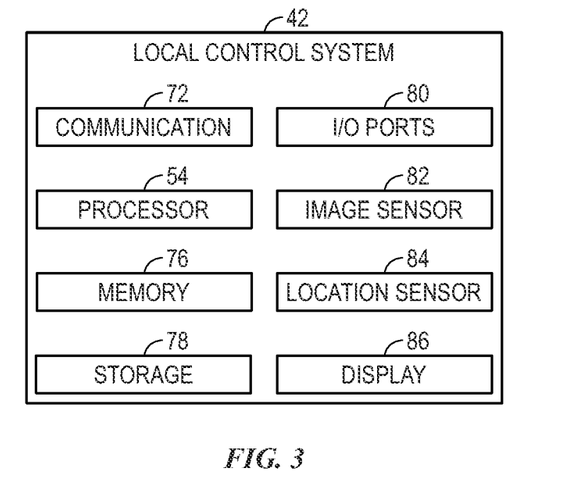
FIG. 3 illustrates example components that may be part of the local control system for the industrial automation system of FIG. 1, in accordance with an embodiment.

With this in mind, FIG. 3 illustrates example components that may be part of the local control system 42, in accordance with embodiments presented herein. For example, the local control system 42 may include a communication component 72, the processor 54, a memory 76, a storage 78, input/output (I/O) ports 80, an image sensor 82 (e.g., a camera), a location sensor 84, a display 86 (e.g., HMI 52), additional sensors (e.g., vibration sensors, temperature sensors), and the like. The communication component 72 may be a wireless or wired communication component that may facilitate communication between the industrial automation equipment 56, the cloud-based computing system 68, and other communication capable devices.

The processor 54 may be any type of computer processor or microprocessor capable of executing computer-executable code. The processor 54 may also include multiple processors that may perform the operations described below. The memory 76 and the storage 78 may be any suitable articles of manufacture that can serve as media to store processor-executable code, data, or the like. These articles of manufacture may represent computer-readable media (e.g., any suitable form of memory or storage) that may store the processor-executable code used by the processor 54 to perform the presently disclosed techniques. Generally, the processor 54 may execute software applications that include programs that enable a user to track and/or monitor operations of the industrial automation equipment 56 via a local or remote communication link. That is, the software applications may communicate with the processor 54 and gather information associated with the industrial automation equipment 56 as determined by the processor 54 via the sensors 16 disposed on the industrial automation equipment 56 and the like.

The memory 76 and the storage 78 may also be used to store the data, analysis of the data, the software applications, and the like. The memory 76 and the storage 78 may represent non-transitory computer-readable media (e.g., any suitable form of memory or storage) that may store the processor-executable code used by the processor 74 to perform various techniques described herein. It should be noted that non-transitory merely indicates that the media is tangible and not a signal.

In one embodiment, the memory 76 and/or storage 78 may include a software application that may be executed by the processor 54 and may be used to monitor, control, access, or view one of the industrial automation equipment 56. As such, the computing device 66 may communicatively couple to industrial automation equipment 56 or to a respective computing device of the industrial automation equipment 56 via a direct connection between the devices or via an indirect connection (e.g., via routers) with the devices. The software application may perform various functionalities, such as tracking statistics of the industrial automation equipment 56, storing reasons for placing the industrial automation equipment 56 offline, determining reasons for placing the industrial automation equipment 56 offline, securing industrial automation equipment 56 that is placed offline, denying access to place an offline industrial automation equipment 56 back online until certain conditions are met, and so forth.

In another embodiments, the memory 76 and/or storage 78 may include a software application that may be executed by the processor 54 and may be used to generate and encode image data representative of data collected from the industrial automation equipment 56. The software application may perform various functionalities, such as facilitating the collection of firmware versions, manufacturer data, network security parameters, compatibility data, lifecycle data, and the like from the industrial automation equipment 56. Additionally, the software application may use the collected data to generate and encode image data in the form of an easily transmissible medium, such as a QR Code®.

The I/O ports 80 may be interfaces that may couple to other peripheral components such as input devices (e.g., keyboard, mouse), sensors, input/output (I/O) modules, and the like. I/O modules may enable the computing device 66 or other automation controllers 54 to communicate with the industrial automation equipment 56 or other devices in the industrial automation system via the I/O modules.

The image sensor 82 may include any image acquisition circuitry such as a digital camera capable of acquiring digital images, digital videos, or the like. The location sensor 84 may include circuitry designed to determine a physical location of the local control system 42. In one embodiment, the location sensor 84 may include a global positioning system (GPS) sensor that acquires GPS coordinates for the processor 54.

The display 86 may depict visualizations associated with software or executable code being processed by the processor 74. In one embodiment, the display 86 may be a touch display capable of receiving inputs (e.g., parameter data for operating the industrial automation equipment 56) from a user of the processor 54. As such, the display 86 may serve as a user interface to communicate with the industrial automation equipment 56. The display 86 may be used to display a graphical user interface (GUI) for operating the industrial automation equipment 56, for tracking the maintenance of the industrial automation equipment 56, and the like. The display 86 may be any suitable type of display, such as a liquid crystal display (LCD), plasma display, or an organic light emitting diode (OLED) display, for example. Additionally, in one embodiment, the display 86 may be provided in conjunction with a touch-sensitive mechanism (e.g., a touch screen) that may function as part of a control interface for the industrial automation equipment 56 or for a number of pieces of industrial automation equipment in the industrial automation application 64, to control the general operations of the industrial automation application 64. In some embodiments, the operator interface may be characterized as the HMI 52, a human-interface machine, or the like. The HMI 52 may present to the computing device 66 image data representative of the configuration of the industrial automation equipment 56.

Although the components described above have been discussed with regard to the local control system 42, it should be noted that similar components may make up other computing devices described herein. Further, it should be noted that the listed components are provided as example components and the embodiments described herein are not to be limited to the components described with reference to FIG. 3. In addition, although the components listed in FIG. 3 are described as being part of the local control system 42, the components may also be part of the supervisory control system 40, the computing device 66, the cloud-based computing system 68, or any other suitable computing device.

Referring back to FIG. 2, in operation, the industrial automation application 64 may receive one or more inputs used to produce one or more outputs. For example, the inputs may include feedstock, electrical energy, fuel, parts, assemblies, sub-assemblies, operational parameters (e.g., sensor measurements), or any combination thereof. Additionally, the outputs may include finished products, semi-finished products, assemblies, manufacturing products, by products, or any combination thereof. To produce the one or more outputs, the processor 54 may control operation of the industrial automation application 64. In some embodiments, the processor 54 may control operation by outputting control signals to instruct industrial automation equipment 56 to perform a control action by implementing manipulated variable set points. For example, the processor 54 may instruct a motor (e.g., an automation device 20) to implement a control action by actuating at a particular speed (e.g., a manipulated variable set point).

In some embodiments, the processor 54 may determine the manipulated variable set points based at least in part on process data. As described above, the process data may be indicative of operation of the industrial automation device 20, the industrial automation equipment 56, the industrial automation application 64, and the like. As such, the process data may include operational parameters of the industrial automation device 20 and/or operational parameters of the industrial automation application 65. For example, the operational parameters may include any suitable type, such as temperature, flow rate, electrical power, and the like.

In some embodiments, the supervisory control system 40 may provide centralized control over operation of the industrial automation application 64. For example, the supervisory control system 40 may enable centralized communication with a user (e.g., operator). To facilitate, the supervisory control system 40 may include the display 86 to facilitate providing information to the user. For example, the display 86 may display visual representations of information, such as process data selected features, expected operational parameters, and/or relationships there between. Additionally, the supervisory control system 40 may include similar components as the processor 54 described above in FIG. 3.

In some embodiments, the local control system 42 may control operation of a portion of the industrial automation application 64 based at least in part on the control strategy determined by the supervisory control system 40. Additionally, the supervisory control system 40 may determine the control strategy based at least in part on process data determined by the local control system 42. Thus, to implement the control strategy, the supervisory control system 40 and the local control systems 42 may be communicatively coupled via a network, which may be any suitable type, such as an Ethernet/IP network, a ControlNet network, a DeviceNet network, a Data Highway Plus network, a Remote I/O network, a Foundation Fieldbus network, a Serial, DH-485 network, a SynchLink network, or any combination thereof.

The local control system 42 may perform data collection operations by identifying and/or accessing components accessible to the local control system 42. Connections and connected devices may be discovered through various methods of system discovery, such as network discovery, I/O tree mapping, stored schematics, and the like. These connections and connected devices may be collected into data representing the configuration of the industrial automation system 10. The method of generating image data representative of the configuration data for transmission is depicted in FIG. 4.

Figure 4:
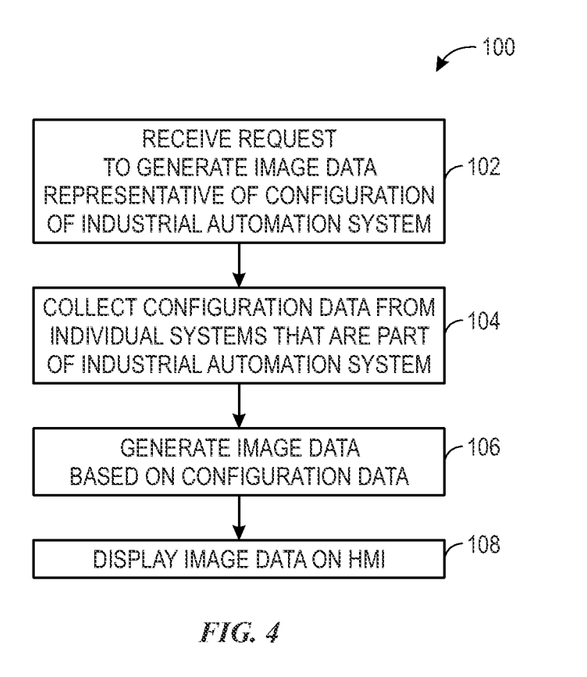
FIG. 4 illustrates a flow chat of a method for generating image data based on configuration data, in accordance with an embodiment.

Keeping this in mind, FIG. 4 illustrates a block diagram of a method 100 that may be performed by the local control system 42 to generate image data representative of a configuration of the industrial automation system 10. Although the method 100 is described as being performed by the local control system 42 and in a particular order, it should be noted that the method 100 may be performed by any suitable computing device and in any suitable order.

Referring now to FIG. 4, at block 102, the local control system 42 may receive a request to generate image data representative of the configuration of the industrial automation equipment. The request may be received directly by the local control system 42 via an input through the HMI 52, via the computing device 66, via the cloud-based computing system 68, or the like. In some embodiments, the request may be received automatically in response to a change to a pre-existing or current configuration being detected. That is, in some embodiments, the local control system 42 may receive a user input changing a configuration aspect of one or more devices. In other embodiments, the local control system 42 may receive a notification from an industrial automation device 20 after the configuration of the respective industrial automation device 20 has updated or changed.

At block 104, the local control system 42 may collect individual system configuration data from a plurality of individual systems communicatively coupled to the local control system 42. In some embodiments, the configuration data may be retrieved from a memory or storage component accessible to the local control system 42. That is, the storage component may include a file or data that lists each of the industrial automation devices 20 that are part of the industrial system 10, the software or firmware loaded on each component of each industrial automation device 20, and the like. In other embodiments, the configuration data may also be collected using a network discovery probe or other suitable software crawler that may ping or access each of the components of the industrial automation system 10 and collect configuration data regarding each component in the industrial automation system 10. In certain embodiments, the configuration data may be collected via any form of removable media. That is, the removable media may be removed from one of the plurality of individual systems and inserted into the local control system 42. The configuration data may be stored in a respective storage component that is part of a respective industrial automation device 20. The configuration data may include details related to hardware components (e.g., devices, routers, form factor, mechanical connecting feature, electrical input features), software components (e.g., firmware version, software version, application data, license data), and any suitable information related to one or more industrial automation device 20 or components therein.

By way of example, the configuration data for each individual system may include a firmware version for various hardware components or equipment, manufacturer identity data, serial number data, network address data, network security parameters, compatibility data, lifecycle data, and the like. The firmware version may be related to the operation of hardware components within the industrial automation device 20. In some embodiments, the firmware of the respective industrial automation device 20 may be configured to control various parameters related to the operator of the device. Additionally, the firmware of the respective industrial automation device 20 may control various network functions and enable connecting to the entire network of the industrial automation system 10. Moreover, the firmware may also control communication between the respective industrial automation device 20 and the industrial automation system 10.

In other embodiments, the firmware of the respective industrial automation device 20 may be updated locally or over the network. That is, if a new firmware version is available, it may be uploaded into the industrial automation device 20 through an input/output port or over the network during a specific period of time. The firmware for the industrial automation device 20 may be stored within the non-volatile memory of a storage component within the respective industrial automation device 20.

Manufacturing identity data and serial number data may be issued to the respective component by a producer or manufacturer. In some embodiments, manufacturing identity data and serial number data may be stored in the storage component within the respective industrial automation device 20. That is, the manufacturing identity data and the serial number data may be stored in a particular memory or storage location within storage component.

Network address data may be assigned to the respective component by a local control system 42 upon accessing the network for the first time. The network address data may be directed towards designating a location for the respective industrial automation device 20 within the encompassing network of the industrial automation equipment 56. In certain embodiments, network address data may refer to an IP address, a MAC address or any suitable data that describes the network properties of the respective industrial automation device 20. In some embodiments, the network address data for the respective industrial automation device 20 may be stored in a particular memory or storage location within the memory of the local control system 42. In other embodiments, the network address data may be stored within a storage component within the respective industrial automation device 20.

Network security parameters may be provided to each network compatible industrial automation device 20 connected to a local network by the local control system 42. In other embodiments, a central router, which controls the local network, may provide the network security parameters to the local control system 42 and each industrial automation device 20 that has network capabilities. The network security parameters may provide protection for each industrial automation device 20 from exterior infiltration attempts and other attacks directed at disrupting the network. With the foregoing in mind, network security parameters may consist of firewall protection, intrusion detection parameters, antivirus parameters, antimalware parameters, access control settings, wireless security parameters, Virtual Private Network (VPN) parameters, and the like. In some embodiments, the network security parameters for the respective industrial automation device 20 may be stored in a particular memory or storage location within the memory of the local control system 42. In other embodiments, the network security parameters for the respective industrial automation device 20 may be stored within a storage component within the respective industrial automation device 20.

Compatibility data and lifecycle data may be issued to the respective component by a producer or manufacturer. The compatibility data of the respective industrial automation device 20 may include data relating to the compatibility (e.g., mechanical compatibility, software compatibility) of the respective industrial automation device 20 with other industrial automation devices 20. By way of example, the compatibility data of the mixer 18 may include data relating to using the depositor 22 in conjunction with the mixer 18. Additionally, the lifecycle data of the respective industrial automation device 20 may include data relating to the lifecycle stage (e.g., early, replacement) of the respective industrial automation device 20. In some embodiments, the lifecycle data includes data generally directed to an expected remaining hours of life of the respective industrial automation device 20 under a wide variety of different operating conditions. These operating conditions may consist of temperature, voltage usage, current usage, daily device usage, operating conditions, and mechanical information. In certain embodiments, the lifecycle data may be dynamically updated by the machine learning module of the cloud-based computing system 68 as it processes data relating to the processes performed by the industrial automation system 10. In some embodiments, the compatibility data and lifecycle data for the respective industrial automation device 20 may be stored in a particular memory or storage location within the memory of the local control system 42. In other embodiments, the compatibility data and lifecycle data for the respective industrial automation device 20 may be stored within a storage component within the respective industrial automation device 20.

In some embodiments, the configuration data may include details regarding how various equipment are communicatively coupled to each other, physically arranged next to each other, or the like. By way of example, in some embodiments, the local control system 42 may connect to control systems of the industrial automation equipment 56 to determine configuration data of a group of industrial automation devices 20. That is, the local control system 42 may query the control systems to retrieve the respective configuration data. In other embodiments, the local control system 42 may connect directly to an industrial automation device 20 or a group of industrial automation devices 20 to determine configuration information. For instance, the local control system 42 may employ network probes to connect to I/O systems 62 to determine I/O tree information for the connected device and determine the configuration of the industrial automation equipment 56. In some embodiments, the local control system 42 may send out a wireless broadcast signal to retrieve configuration information from the group of industrial automation devices 20. The wireless broadcast signal may be Wi-Fi, mobile telecommunications technology (e.g., 2G, 3G, 4G, LTE), Bluetooth®, near-field communications technology, and the like. In another embodiment, the local control system 42 may use hardwired connections between the local control system 42 and the group of industrial automation devices 20 to determine I/O tree information for the connected device and determine the configuration of the industrial automation equipment 56.

In certain embodiments, the local control system 42 may utilize machine learning techniques to monitor the retrieval of the configuration data from the group of industrial automation devices 20. That is, retrieving certain types of configuration data may involve a multi-step process that includes accessing certain applications or storage components, querying certain data fields, and extracting particular datasets. In this case, the machine learning techniques may identify patterns in accessing configuration data and create models that emulate the processes involved to acquire existing configuration data. In some embodiments, the machine learning techniques may enable the local control system 42 to use these identified patterns to reduce the amount of time taken by the local control system 42 to collect configuration data from the group of industrial automation devices 20. Additionally, the local control system 42 may store information related to the retrieval processes in a database 69 that may include various models for retrieving configuration data from various industrial automation devices 20.

At block 106, the local control system 42 may then generate image data based on collected configuration data. In some embodiments, the local control system 42 may generate the image data in the form of a QR Code®. Since the image data may be limited with respect to the amount of data that may be embedded therein, the local control system 42 may generate multiple images (e.g. multiple QR Codes®), such that the multiple images include the comprehensive collection of configuration data for the components of the industrial automation system 10. In some embodiments, the multiple images may have an associated order to ensure correct and complete transmission and analysis of the configuration data. In some embodiments, the local control system 42 may encrypt the images to securely transmit or protect the images. The encryption techniques may include encrypting an order in which the images are to be decrypted and combined together to retrieve the comprehensive set of configuration data. That is, the encryption techniques may include attaching metadata to the encrypted image to include information relating to the order of in which images are to be decrypted and combined together.

In certain embodiments, the local control system 42 may extract product data, mechanical data, and layout data of respective industrial automation system 10 and the individual industrial automation devices 20 that make up the industrial automation system 10 utilized in generating the image data. That is, the local control system 42 may utilize multiple sources of data to generate the image data representative of the configuration data. The product data for the respective industrial automation system 10 may include the previously discussed firmware versions, manufacturing identity data, serial number, network address data, network security parameters and other suitable data directed to describing the individual industrial automation device 20. In some embodiments, extracting the product data may include accessing the storage component within the respective industrial automation device 20 mentioned previously. In other embodiments, extracting the product data may include accessing the memory of the local control system 42 after the local control system 42 has performed the I/O crawl process or the like.

The mechanical data of the industrial automation system 10 may include compatibility data, dimensional data, and other physical properties the individual industrial automation devices 20 of the industrial automation system 10. In some embodiments, extracting the mechanical data may include accessing the storage component within the respective industrial automation device 20 mentioned previously. In other embodiments, extracting the mechanical data may include accessing the memory of the local control system 42 after the local control system 42 has performed the I/O crawl.

The layout data of the industrial automation system 10 may include parts of or the entirety of the mechanical data and the product data of the industrial automation system 10. In certain embodiments, extracting the layout data may include utilizing the I/O trees discovered by the local control system 42 in combination with the mechanical and product data of the respective industrial automation devices 20 to create the layout data of the local control system 42. The layout data may correspond to a physical layout, a network layout, a security layout, a hierarchical layout, or the like. In some embodiments, the layout data of the industrial automation system 10 may be extracted from previous configuration data. That is, the local control system 42 may utilize previous configuration data in addition to the current compatibility data of the respective industrial automation devices 20 and the previously discussed I/O trees in creating the layout data of the current configuration data for the industrial automation system 10.

At block 108, the local control system 42 may display the image via the HMI 52 or via the webpage of the computing system 66. In some embodiments, the computing device 66 may acquire the image via the image sensor 82. Furthermore, the computing device 66 may transmit the acquired image to any suitable destination, such as the cloud-based computing system 68. In some embodiments, the computing device 66 may also transmit current location data with the image data. As such, the configuration data embedded in the image data may be associated with a particular location.

Additionally, at block 108, a push notification may be sent to alert the operator that the image data is ready for scanning. In some embodiments, the image data may automatically be displayed via the HMI 52 or via the computing device 66, while in other embodiments the image data may only be displayed when the operator is detected to be physically near the local control system 42. That is, the operator's computing device 66 may be detected near the local control system 42 and thus the push notification may be sent to the operator's computing device 66. In this way, the HMI 52 or the computing device 66 may communicate the updated configuration data without having a network connection outside of a local network that includes the industrial system 10.

Figure 5:
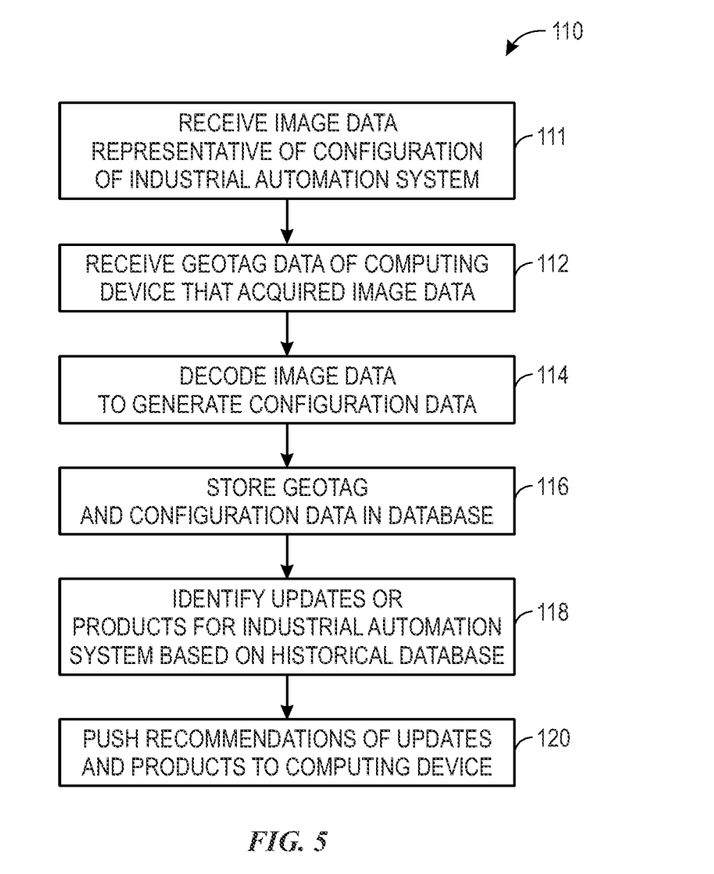
FIG. 5 illustrates a flow chat of a method for receiving, decoding, and storing the generated image data, in accordance with an embodiment.

FIG. 5 illustrates a block diagram of a method 110 carried out by the cloud-based computing system 68. At block 111, the cloud-based computing system 68 may receive image data representative of the configuration data for the industrial automation system 10 from the computing device 66. In some embodiments, the configuration data may be received via a secure and dedicated receiving component that may only be accessible by the cloud-based computing system 68 and the computing device 66. That is, the secure and dedicated receiving component may include security features which enable the operator to verify the identity of the computing device 66. These security features may include, but are not limited to passwords, public/private key pairs, multiple factor authentication, and the like. Each operator may be given individualized methods of identification verification. In some embodiments, the operator may choose which method of verification before transmission. In other embodiments, the method of verification may be predetermined by the cloud-based computing system 68.

In some embodiments, the cloud-based computing system 68 may receive multiple sets of image data representative of configuration data for the industrial automation system from the computing device 66. In this way, the entire configuration of the industrial automation system 10 may be transmitted using the limited data available in the image data. That is, the image data may store a limited amount of data and additional images may include additional data to provide the entire configuration of the industrial automation system 10. In some embodiments, each image data of the set of image data may be associated with an order number to ensure that the images are decoded in a particular order to enable the cloud-based computing system 68 to obtain the complete configuration data. The associated order may also be employed for improved encryption techniques. Indeed, the order in which the images are decrypted or received may provide an additional layer of security in the transmission of the images. By way of example, the decryption of a first ordered image may provide a key or algorithm for decrypting the second ordered image.

In some embodiments, the cloud-based computing system 68 may have access to an ordering algorithm or scheme that may enable the cloud-based computing system 68 to properly order the received images. For example, the received image data may include metadata that represents an order in which the images are to be decoded or decrypted. The cloud-based computing system 68 may use the accessible ordering algorithm or key to determine the order of the images and decode the images according to the determined order.

Additionally, the cloud-based computing system 68 may then receive geotag information or location information of the computing device 66 that sent the image data and may then associate the geotag information with the received image data or sets of image data (block 112). In some embodiments, the geotag information may be automatically acquired based on a GPS system present within the computing device 66, a network address of the computing device 66, and the like. In other embodiments, the geotag information may be manually entered into the computing device 66 with the transmitted image data.

With the foregoing in mind, at block 113, the cloud-based computing system 68 may decode the image data or sets of image data to generate the configuration information that was encoded by the automation controller 54. Additionally, the cloud-based computing system may decrypt the image data or sets of image data based on the decryption techniques discussed previously. Decrypting the image data may involve decoding the metadata stored with the image data, as mentioned above.

It should be noted that the cloud-based computing system 68 may not be limited to any particular software to decode the encoded image data or sets of image data. The decoded image data or sets of image data may provide the configuration data of the industrial automation system 10. That is, the cloud-based computing system 68 may determine the product data, the mechanical data, and the layout data of the industrial automation system 10 from the decoded image data or sets of image data. The cloud-based computing system 68 may use the product data, the mechanical data, and the layout data of the industrial automation system 10 to construct the configuration data of the respective industrial automation system 10.

As shown in block 114, the decoded configuration data may be stored within a database 69 by the cloud-based computing system 68 with the geo-tag information. In certain embodiments, the database 69 may contain a number of configuration data sets from a number of different operators. Moreover, the database 69 may store a number of configuration data sets, which may be associated with a number of different geotags from a number of different industrial automation systems. The database 69 may be a cloud server hosted by a provider of the service or a secure third-party. In some embodiments, the database 69 may be a physical server run by the provider of the service.

In certain embodiments, the cloud-based computing system 68 may then begin to analyze the stored configuration data from the database 69 to provide recommendations to the operator as indicated in block 115. The cloud-based computing system 68 may generate these recommendations by comparing the current configuration information of the operator to pre-existing configuration data stored in the database 69. The recommendations may include identified firmware updates for one or more individual systems within the industrial automation system 10, product recommendations for the industrial automation system 10, and the like. That is, the cloud-based computing system 68 may compare the product data, mechanical data, and the layout data from two different sets of configuration data to determine similarities, differences, and areas for improvement based on configuration data for other industrial automation systems 10 located within the same country, city, or general location.

By way of example, the product data of the configuration data may be similar to the product data of a different configuration data, but the layout data may indicate that certain components are arranged according to a different manner. The cloud-based computing system 68 may recognize and create recommendations that are directed towards changing the layout data to achieve higher efficiency, less power usage, and the like.

In some embodiments, the cloud-based computing system 68 may also utilize stored manufacturing information to identify relevant firmware updates to individual industrial automation devices 20. The cloud-based computing system 68 may achieve this by comparing the installed firmware versions of the compatible industrial automation devices 20 to the current and manufacturer recommended firmware versions. The cloud-based computing system may store a dynamically updated list of current and manufacturer recommended firmware versions for the industrial automation devices 20 within the database 69. That is, the cloud-based computing system 68 may utilize the list of current and manufacturer recommended firmware versions in creating recommendations for the respective industrial automation devices 20 managed by other operators. Additionally, the recommendations may contain directives regarding maintaining and operating certain industrial automation devices 20. The cloud-based computing system 68 may use the lifecycle data of different operator's industrial automation devices 20 to determine the best operating conditions given similar configurations.

The cloud-based computing system 68 may then transmit recommendations directly to the computing device 66 (block 116). The computing device 66 may receive the recommendations directly via a "push notification" alerting the operator of the recommendations. In some embodiments, the "push notification" may be sent to the operator when the operator is within a proximity to the local control system 42. The "push notification" may cause the computing device 66 to display the relevant notification on the computing device 66.

In certain embodiments, the new firmware updates may be automatically downloaded to the local control system 42 for transmission to the respective industrial automation device 20. That is, the operator may indicate if new firmware updates should be automatically installed onto the respective automation device 20. Additionally, the operator may indicate that the new firmware updates be installed on a daily, weekly, or monthly schedule. In other embodiments, the operator may indicate that the new firmware update be manually installed.

By employing the techniques described in the present disclosure, the systems and the methods described herein may allow for an operator to better interpret and analyze industrial automation system configurations. The recommendations provided by the cloud-based computing system 68 may serve as a unique tool to provide valuable insight into the operator's configuration and relevant adjustments that may be made to improve the industrial automation system as a whole. Indeed, utilizing encoded image data presented, in some embodiments, as a QR Code®, to provide configuration data by transmitting said image data through the operator's computing device 66 in a secure method to a cloud-based computing system 68 will lead to a wide array of improvements within the automation industry.

While only certain features of the present disclosure have been illustrated and described herein, many modifications and changes will occur to those skilled in the art. It is, therefore, to be understood that the appended claims are intended to cover all such modifications and changes as fall within the true spirit of the embodiments described herein.

The invention claimed is:

1. A system, comprising:
  an electronic display; and
  a control system comprising at least one processor configured to:
    receive a request to generate a plurality of images representative of configuration data associated with a plurality of industrial automation devices communicatively coupled to the control system;
    determine I/O tree information indicative of a layout of the plurality of industrial automation devices based on one or more connections between the plurality of industrial automation devices and the control system via one or more input/output (I/O) ports of the control system;
    retrieve mechanical data associated with the plurality of industrial automation devices from a storage component, wherein the mechanical data comprises dimensional data related to one or more physical properties of each of the plurality of industrial automation devices;

determine layout data of the plurality of industrial automation devices based on the I/O tree information and the mechanical data, wherein the layout data corresponds to a plurality of physical positions of the plurality of industrial automation devices with respect to each other;

determine the configuration data based on the I/O tree information and the layout data, wherein the configuration data is indicative of the plurality of physical positions of the plurality of industrial automation devices with respect to each other;

encode the configuration data into the plurality of images, wherein the configuration data comprises the I/O tree information and the layout data;

detect a presence of a computing device within a threshold distance of the control system in response to the configuration data being encoded into the plurality of images; and send at least one of the plurality of images to the computing device in response to detecting the presence of the computing device, wherein the computing device is configured to display the at least one of the plurality of images via the electronic display.

2. The system of claim 1, wherein the request is received via an input device communicatively coupled to the control system.

3. The system of claim 2, wherein the input device corresponds to the electronic display.

4. The system of claim 1, wherein the at least one processor is configured to encode the configuration data into the plurality of images by encrypting an order in which the plurality of images is to be decrypted.

5. The system of claim 4, wherein the order is stored in metadata of at least one of the plurality of images.

6. The system of claim 1, wherein the at least one processor is configured to:
  detect a change in the configuration data, wherein the change in the configuration data comprises updated I/O tree information, updated layout data, or both;
  determine updated configuration data based on the change;
  encode the updated configuration data into an additional plurality of images;
  display at least one of the additional plurality of images via the electronic display; and
  send an alert to a computing system, wherein the alert is indicative of the change.

7. The system of claim 6, wherein the at least one processor is configured to send the alert to the computing system in response to detecting that the computing system is within the threshold distance of the control system.

8. The system of claim 1, wherein the plurality of industrial automation devices and the control system are connected via one or more network probes.

9. A method, comprising:
  determining, via at least one processor, I/O tree information indicative of a layout of a plurality of industrial automation devices of an industrial automation system based on one or more connections between the plurality of industrial automation devices and a control system via one or more input/output (I/O) ports of the control system;
  retrieving mechanical data associated with the plurality of industrial automation devices from a storage component, wherein the mechanical data comprises dimensional data related to one or more physical properties of each of the plurality of industrial automation devices;
  determining, via the at least one processor, configuration data of the plurality of industrial automation devices based on the I/O tree information and the mechanical data, wherein the configuration data corresponds to a plurality of physical positions of the plurality of industrial automation devices with respect to each other;
  generating, via the at least one processor, a first set of images representative of the configuration data;
  displaying, via the at least one processor, at least one image of the first set of images via an electronic display in response to detecting a presence of a computing device within a threshold distance of the control system;
  detecting, via the at least one processor, a change in the configuration data;
  determining, via the at least one processor, updated configuration data based on updated I/O tree information, updated mechanical data, or both;
  encoding, via the at least one processor, the updated configuration data comprising the updated I/O tree information, the updated mechanical data, or both into a second set of images; and
  displaying, via the at least one processor, at least one additional image of the second set of images via the electronic display.

10. The method of claim 9, comprising sending an alert to a computing system, wherein the alert is indicative of the change.

11. The method of claim 10, wherein the alert is sent to the computing system in response to detecting that the computing system is within the threshold distance of the control system.

12. The method of claim 9, wherein the configuration data comprises firmware version, one or more network security parameters, compatibility data, lifecycle data, or any combination thereof.

13. The method of claim 12, wherein the one or more network security parameters comprise a firewall protection, one or more intrusion detection parameters, one or more antivirus parameters, one or more antimalware parameters, one or more access control settings, one or more wireless security parameters, one or more Virtual Private Network (VPN) parameters, and any combination thereof.

14. The method of claim 9, wherein generating the first set of images comprises:
  retrieving geotag data associated with the plurality of industrial automation devices; and
  encoding the geotag data into the first set of images.

15. A computer-readable medium comprising computer-executable instructions that, when executed by a processor, are configured to cause the processor to perform operations comprising:
  receiving a first set of image data representative of configuration data associated with a plurality of industrial automation devices of an industrial automation system from a computing device, wherein the configuration data comprises at least one of:
    I/O tree information indicative of a layout of the plurality of industrial automation devices based on one or more connections between the plurality of industrial automation devices and a control system via one or more input/output (I/O) ports of the control system; and
    layout data of the plurality of industrial automation devices based on the I/O tree information, wherein the layout data corresponds to a plurality of positions of the plurality of industrial automation devices with respect to each other;

receiving geotag data associated with the first set of image data, wherein the geotag data is indicative of a city or a country in which the plurality of industrial automation devices is positioned;

decoding the first set of image data to generate the configuration data associated with the plurality of industrial automation devices of the industrial automation system;

storing the geotag data and the configuration data in a database;

retrieving, from the database, additional configuration data associated with one or more other industrial automation devices located in the same city or country as represented in the geotag data;

comparing the configuration data to the additional configuration data to determine one or more recommendations for one or more updates or one or more replacements of the plurality of industrial automation devices based on the configuration data, the geotag data, and the additional configuration data stored in the database; and transmitting, via the processor, the one or more recommendations to the computing device.

16. The computer-readable medium of claim 15, wherein the computer-executable instructions configured to cause the processor to perform the operations comprising decoding the first set of image data comprise:

determining an order for decrypting each of the first set of image data; and decrypting each of the first set of image data according to the order.

17. The computer-readable medium of claim 15, wherein the additional configuration data comprises manufacturing information relating to the plurality of industrial automation devices.

18. The computer-readable medium of claim 15, wherein the configuration data comprises product data.

19. The computer-readable medium of claim 15, wherein the one or more recommendations comprise one or more firmware updates, one or more maintenance directives, one or more operating parameters, or any combination thereof.

20. The computer-readable medium of claim 15, wherein the one or more recommendations are transmitted in response to detecting that the computing device is within a threshold distance of the plurality of industrial automation devices.

* * * * *